(12) United States Patent
Topper (10) Patent No.: US 6,545,719 B1
(45) Date of Patent: Apr. 8, 2003

(54) APPARATUS AND METHOD FOR CONCEALING INTERPOLATION ARTIFACTS IN A VIDEO INTERLACED TO PROGRESSIVE SCAN CONVERTER

(75) Inventor: Robert J. Topper, Hatboro, PA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/539,608

(22) Filed: Mar. 31, 2000

(51) Int. Cl.$^7$ .......................... H04N 7/01; H04N 11/20
(52) U.S. Cl. ...................... 348/448; 348/451; 348/452; 348/458; 348/447
(58) Field of Search ................................ 348/446, 448, 348/458, 618, 447, 452, 451, 606, 620, 621, 700, 701; 382/260, 261, 264, 296, 300

(56) References Cited

U.S. PATENT DOCUMENTS

| | | | |
|---|---|---|---|
| 4,673,978 A | | 6/1987 | Dischert et al. |
| 4,677,483 A | | 6/1987 | Dischert et al. |
| 4,816,899 A | * | 3/1989 | Strolle et al. ............ 375/240.25 |
| 5,337,089 A | | 8/1994 | Fisch |
| 5,386,235 A | * | 1/1995 | Ko ............................ 348/427.1 |
| 5,619,272 A | | 4/1997 | Salmon et al. |
| 5,619,273 A | * | 4/1997 | Sugiyama ..................... 348/452 |
| 5,844,617 A | * | 12/1998 | Faroudja et al. ............. 348/441 |
| 6,118,488 A | * | 9/2000 | Huang ........................ 348/452 |
| 6,201,577 B1 | * | 3/2001 | Swartz ........................ 348/558 |
| 6,262,773 B1 | * | 7/2001 | Westerman ................. 348/448 |
| 6,295,091 B1 | * | 9/2001 | Huang ........................ 348/448 |
| 6,327,000 B1 | * | 12/2001 | Auld et al. .................. 348/441 |
| 6,411,333 B1 | * | 6/2002 | Auld et al. .................. 348/441 |
| 6,414,719 B1 | * | 7/2002 | Parikh ........................ 348/448 |
| 6,421,090 B1 | * | 7/2002 | Jiang et al. ................. 348/452 |

\* cited by examiner

Primary Examiner—John Miller
Assistant Examiner—Linus H. Lo
(74) Attorney, Agent, or Firm—RatnerPrestia (57) ABSTRACT

Progressive-scan video signals that are generated from interlaced-scan video signals by interpolation may be subject to temporal distortion when the interstitial interpolated lines have a different time reference than the interlaced lines. This distortion may be mitigated by detecting vertical low-frequency spatial distortion in an interpolated video signal and by generating a compensating signal that, when added to the interpolated video signal reduces that vertical low-frequency spatial distortion. A spatial low-pass filter is applied to corresponding pixels of several adjacent lines of the current field of the original interlaced image. Concurrently, a spatial low-pass filter is applied to corresponding pixels of several interpolated lines that are inserted between the lines of the interlaced image to produce the progressive image. At each pixel position, the low-pass filtered values are compared. If the difference between the low-pass filtered values exceeds a predetermined threshold value, a value approximately equal to the difference between the original pixels and the interpolated pixels is added to the interpolated pixel.

15 Claims, 5 Drawing Sheets

APPARATUS AND METHOD FOR CONCEALING INTERPOLATION ARTIFACTS IN A VIDEO INTERLACED TO PROGRESSIVE SCAN CONVERTER

BACKGROUND OF THE INVENTION

The present invention concerns video interlaced to progressive scan conversion and, in particular, to a method for detecting and correcting errors in the interpolated portions of a progressive image.

Digital television (DTV) signals conforming, for example, to the Advanced Television Systems Committee (ATSC) standard, may have a large number of formats. These formats are typically referenced by the number of horizontal lines in the image and whether each image frame is formed from two fields, each containing alternate lines of the frame (interlaced) or from a single image field containing all of the lines of the frame (progressive). Listed from highest resolution to lowest resolution, the television signal formats defined by the ATSC standard are referenced by the designations, 1080I, 720P, 480P and 480I. In these designations, the number refers to the number of horizontal lines in the image and the letter defines the resulting image as being interlaced (I) or progressive (P).

Television receivers that operate according to the standard set by the National Television Standards Committee (NTSC) display 480 lines of active video information as two interlaced fields and, so, have a resolution of 480I. Most of the existing programming in the United States conforms to the NTSC standard.

ATSC television receivers may support many different types of monitors. An ATSC receiver may, for example, be connected to a multi-sync monitor that can adapt to display whatever signal type is being received. This type of multi-sync monitor is typically referred to as a native mode monitor as it allows each possible type of ATSC signal to be displayed at its intended resolution. Alternatively, ATSC receivers may be purchased that can be connected to a standard NTSC monitor. One such receiver is the TU-DST51 DTV Decoder Set-Top Box manufactured by Panasonic. This receiver converts each ATSC signal type into a 480I output signal that may be displayed on the NTSC monitor. The Panasonic receiver also supports the other types of monitors, automatically converting the received input signal to the format that is supported by the specified monitor.

It is well known that interlaced video signals have artifacts caused by the interlacing of video fields that occur at two different instants. One such artifact is vertical dot crawl. This artifact occurs at vertical edges in the image, typically at edges between portions of the image having different colors. As the name implies, the vertical dot crawl artifact is seen as a line of dots that seem to move from the bottom to the top of the frame. If the display device supports progressive video signals, these artifacts of interlaced scanning may be removed, or at least mitigated, by converting the interlaced video signal to a progressive video signal before it is displayed.

There are many methods for converting an interlaced video signal to a progressive video signal. Typically, interpolated image lines are inserted between the existing lines in each image field of the video signal. These methods are described in a paper by K. Sugiyama et al. entitled "A Method of De-interlacing with Motion Compensated Interpolation," *IEEE Transactions on Consumer Electronics*, Vol. 45, No. 3, 1999 pp. 611–616.

Figure 1:
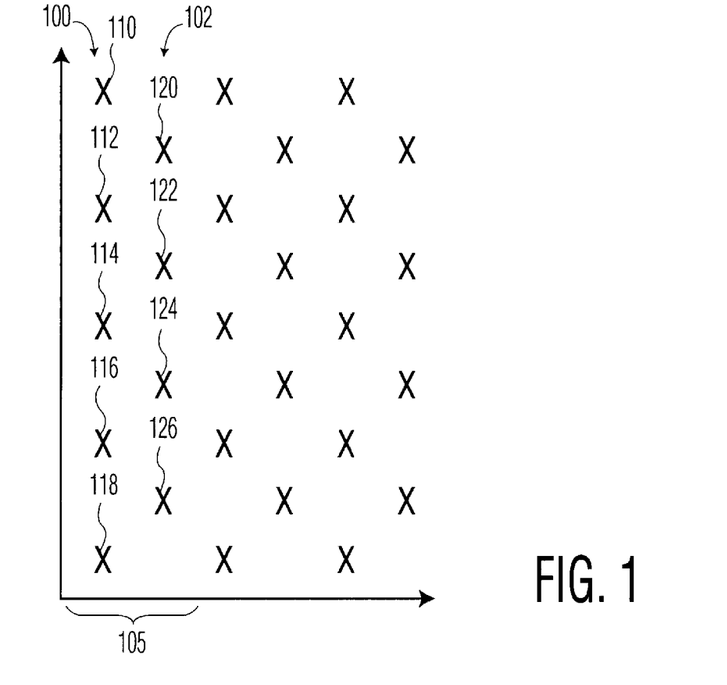
FIG. 1 is a vertical temporal graph showing an interlaced video signal.

FIG. 1 is a vertical-temporal graph that illustrates the frame structure of an interlaced video signal. Each of the "X"s in FIG. 1 represents a horizontal line of a video image field. Each vertical line of Xs represents an image field. In vertical temporal graphs, the horizontal lines of the video images are shown as perpendicular to the surface of the page and the fields advance across the page from left to right. As can be seen from FIG. 1, the horizontal lines 110, 112, 114, 116 and 118 of the first image field 100 are vertically offset from the lines 120, 122, 124 and 126 of the second image field 102. The combination of the fields 100 and 102 forms the image frame 105.

Figure 2:
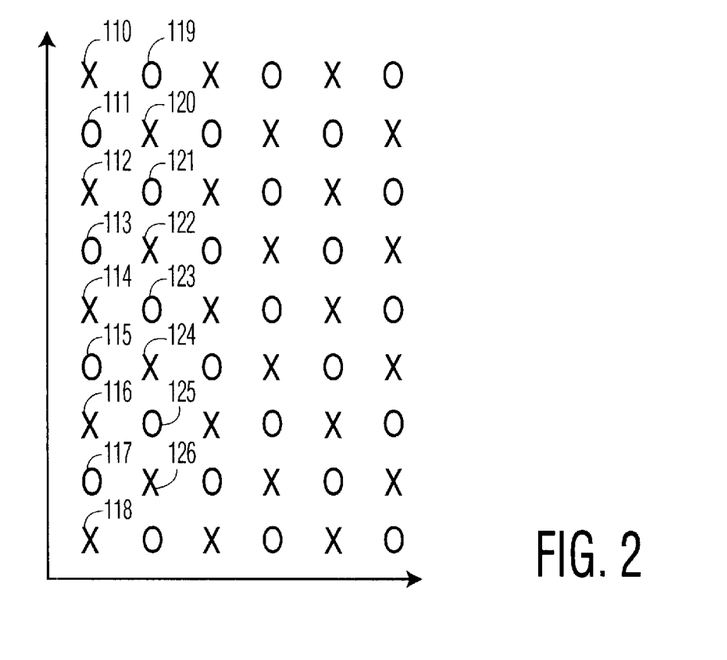
FIG. 2 is a vertical temporal graph showing a progressive video signal generated from the interlaced video signal of FIG. 1.

The interlaced image sequence shown in FIG. 1 is converted to a progressive sequence by adding horizontal lines to each image field as shown in FIG. 2. These added lines are shown in FIG. 2 as "O"s. The added lines are positioned between respective pairs of lines in the original field. For example, the lines 111, 113, 115 and 117 are inserted between the original lines 110, 112, 114, 116 and 118 and the lines 121, 123 and 125 are inserted between the original lines 120, 122, 124 and 126 as shown in FIG. 2. These inserted lines may be generated in many different ways, one such method simply repeats the preceding (or succeeding) line in each field. Another method averages successive lines to generate a spatially interpolated line. Both of these methods produce progressive video displays but these displays typically have a lower vertical resolution than a display produced by a true progressive signal having the same number of vertical lines.

Another method for converting an interlaced image into a progressive image combines successive fields, such that the lines from the next field are inserted between the lines of the current field. An alternate method averages fields on either side of the current field to generate temporally interpolated lines. The images produced by these methods typically have better vertical resolution than the spatially interpolated images but exhibit distortion when there is motion among the fields in the image sequence. Several motion-adaptive interpolation techniques have been proposed to eliminate or at least reduce this motion distortion. The simplest method is to apply a motion detector to the image sequence, applying spatial interpolation in regions of the image that exhibit inter-field motion and applying temporal interpolation in regions that do not change from field to field. These techniques, however, provide images having different levels of vertical resolution in different image areas. In addition, the boundary areas between the temporally interpolated pixels and the spatially interpolated pixels may exhibit relatively low-frequency flickering artifacts that detract from the perceived quality of the image.

Motion compensated interpolation is another technique that may be used to generate the interpolated lines in a progressive image. This method divides the image into blocks and, for each block, determines a best matching block from the previous image field, next image field or a combination of the previous and next image fields. The lines of samples in this block are then applied as the interstitial lines in the blocks of the interlaced image to form an equivalent block of a progressive image. While this method produces less distortion related to changes in vertical resolution, it may exhibit another type of distortion, commonly known as blocking distortion, in which the block structure of the image becomes visible in the reproduced image. The block structure becomes visible because the matching blocks for some blocks in the image are better matches than the matching blocks for other blocks of the image.

SUMMARY OF THE INVENTION

The present invention is embodied in an apparatus and a method for detecting low-spatial frequency distortion in an interpolated video signal and for generating a compensating signal that, when added to the interpolated video signal reduces the low-spatial frequency distortion.

According to one aspect of the invention, a spatial low-pass filter is applied to corresponding pixels of several adjacent lines of the current field of the original interlaced image. Concurrently, a spatial low-pass filter is applied to corresponding pixels of several interpolated lines that are inserted between the lines of the interlaced image to produce a progressive image. At each pixel position, the low-pass filtered values are compared. If the difference between the low-pass filtered values exceeds a predetermined threshold value, a value approximately equal to the difference between the original pixels and the interpolated pixels is added to the interpolated pixel.

DETAILED DESCRIPTION

Briefly, the present invention reduces interpolation errors during the conversion of an image from interlaced scan to progressive scan by comparing the low-frequency vertical components of the original lines and the interpolated lines. If the difference is greater than a threshold then that difference is added to the interpolated lines.

Figure 4:
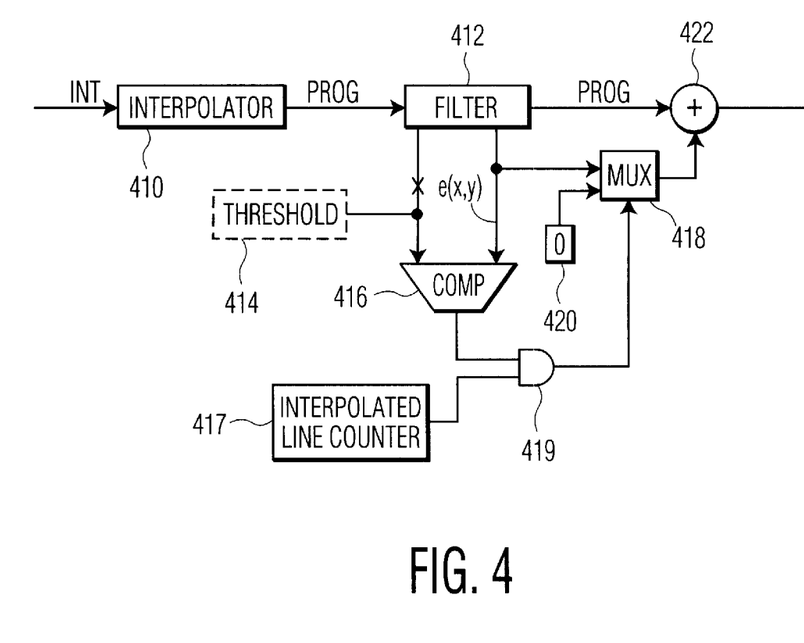
FIG. 4 is a block diagram of an image interpolation system that includes an embodiment of the present invention.

FIG. 4 is a block diagram of an interlace-to-progressive converter that includes an embodiment of the present invention. The exemplary system receives an interlaced scan video signal, $I(x,y)$, at an input port to an interpolator 410. The interpolator 410 interpolates lines of video samples between successive pairs of lines of the interlaced signal $I(x,y)$ to provide an interpolated signal $I(x,y+1)$. The interpolator 410 then combines the interpolated signal $I(x,y+1)$ with the interlaced signal $I(x,y)$ and provides the result as a progressive scan signal PROG. This signal has lines of the interlaced signal $I(x,y)$ and of the interpolated signal $I(x,y+1)$ on alternate lines. The interpolator 410 may be one of a number of different kinds of interpolators, a few of which are described below with reference to FIGS. 6, 7 and 8.

The progressive scan signal PROG is applied to a filter 412 which, as described above, generates low-frequency vertical components for each pixel of the interlaced signal $I(x,y)$. An exemplary filter 412 is described below with reference to FIG. 5. The output signals provided filter 412 are the progressive signal PROG and a corresponding error signal, $e(x,y)$ which represents the difference between low-frequency vertical components of the original interlaced scan lines (i.e. the signal $I(x,y)$) and corresponding samples of the interpolated signal $I(x,y+1)$ generated by the interpolator 410.

The error signal $e(x,y)$ is applied to a comparator 416 where it is compared to a threshold value provided, also provided by the filter 412, as described below with reference to FIG. 5. In the exemplary embodiment of the invention, the threshold value provided by the filter 412 may be, for example, five percent of the maximum sample value currently being processed by the filter. It is contemplated, however, that the threshold value may be a value that changes with variations in the input image according to another formula. Alternatively, the threshold value may be a constant value provided by a source 414, shown in phantom. When the source 414 is used to provide the threshold value, the connection marked with an "x" between the comparator 416 and the filter 412 is broken. The source 414 may be, for example, a programmable or hard-wired register.

The exemplary comparator 416 produces a logic-high output signal when the error signal $e(x,y)$ exceeds the threshold value and a logic-low output signal otherwise. The output signal of the comparator 416 is applied to one input terminal of an AND gate 419, the other input terminal of which is coupled to receive a signal indicating that the line currently being processed is an interpolated line. This signal may be generated by a modulo 2 counter 417 which receives the line clock signal of the progressive video signal PROG. On alternate lines, this counter provides logic-high values, indicating that the respective lines are interpolated lines, and logic low-values indicating that the respective lines are from the original interlaced scan signal. Thus, when the counter 417 indicates that the signal PROG provided by filter 412 is an interpolated line, the AND gate 419 passes the output signal of the comparator 416 to the control input terminal of a multiplexer 418. The multiplexer is coupled to receive the error signal $e(x,y)$ at one signal input port and to receive a value of zero at its other signal input port. The zero value is provided by a source of constant value 420. The multiplexer 418 is configured to pass the zero value when the signal applied to the control input port is logic-low and to provide the signal $e(x,y)$ when the control signal is logic-high.

The output signal of the multiplexer 418 is applied to one input port of an adder 422, the other input port of the adder is coupled to receive the sampled data signal PROG. When the samples of the signal PROG provided by the filter 412 are interpolated samples and when the value of the error signal $e(x,y)$ exceeds the threshold value, the adder 422 adds the error signal $e(x,y)$ to the current sample of the signal PROG.

Figure 5:
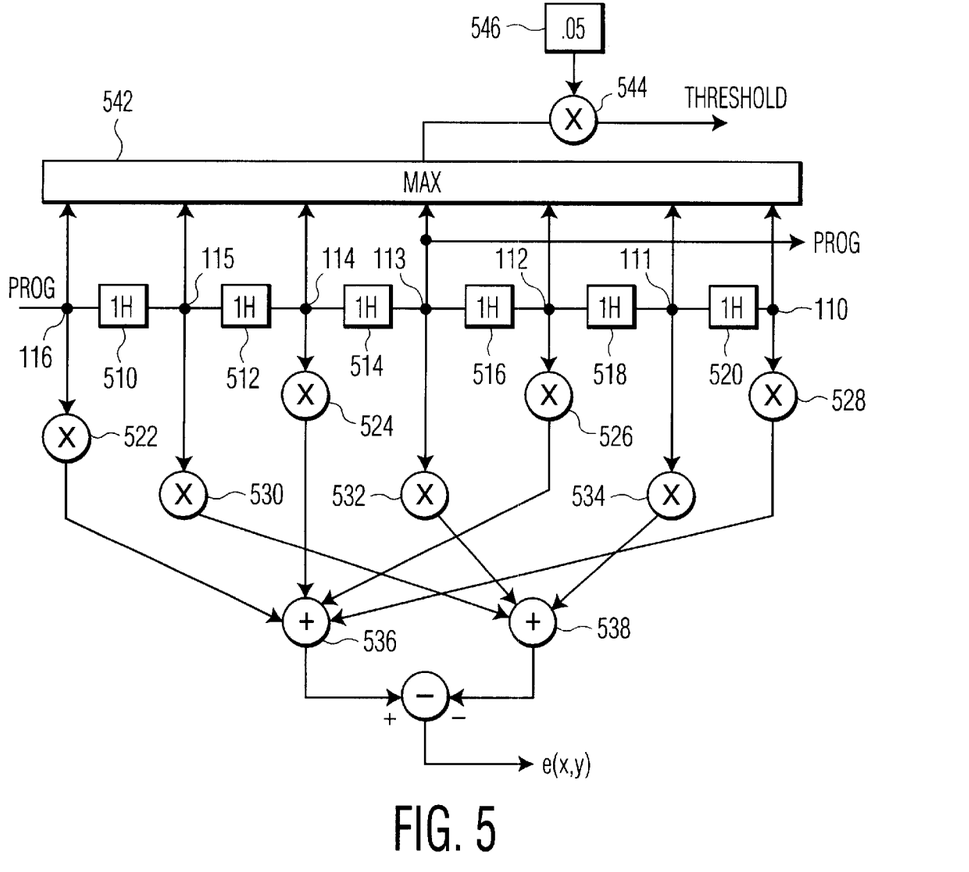
FIG. 5 is a block diagram of an image filtering system that may be used in the image interpolation system shown in FIG. 4.

FIG. 5 is a block diagram of an exemplary filter 412 that may be used in the interpolation system shown in FIG. 4. The exemplary filter includes six delay elements. 510, 512, 514, 516, 518 and 520 connected in series. Each of the delay elements delays the progressive signal PROG by one horizontal line interval (1H). Referring the filter shown in FIG. 5 to the vertical temporal graph of FIG. 3, if the sample available at the input port of the filter is sample 116, the samples available at the output ports of the respective delay elements 510, 512, 514, 516, 518 and 520 are the samples 115, 114, 113, 112, 111 and 110. The input port of the filter is coupled to provide its sample value to the delay element 5 10 and to a coefficient multiplier 522 while the output ports of the respective delay elements 512, 516 and 520 are coupled to provide their sample values to the respective coefficient multipliers 524, 526 and 528. The output signals provided by the multipliers 522, 524, 526 and 528 are applied to a summing circuit 536.

In the same way, the output signals of the delay elements 510, 514 and 518 are applied to respective coefficient multipliers 530, 532 and 534, the output signals of which are summed by a summing circuit 538. The output signal of the delay element 514 is the progressive signal PROG delayed by three line intervals from the signal PROG that is applied to the input port of the filter. If this signal is a line of the interpolated signal, I(x,y+1), generated by the interpolator 410, then the output signal of the summing circuit 536 is the low-pass filtered vertical spatial frequencies of the input signal I(x,y) while the output signal of the summing circuit 538 is the low-pass filtered vertical spatial frequencies of the interstitial interpolated signal I(x,y+1). The signal provided by the summing circuit 538 is subtracted from the signal provided by the summing circuit 536 in the subtracter 540 to generate the error signal e(x,y).

In the exemplary embodiment of the invention, the delay elements of the filter 412 are also used to generate the threshold value that is applied to the comparator 416. In the example described above with reference to FIGS. 3 and 5, the input signal PROG and the output signals of the series connected delay elements 510, 512, 514, 516, 518 and 520 are applied to a maximum circuit 542. The output signal of the maximum circuit is the maximum sample value of the respective sample values currently being processed from the lines 110, 111, 112, 113, 114, 115 and 116, shown in FIG. 3. This sample value is multiplied by a factor of 0.05 provided by a source of constant value 546 (e.g. a programmable or hard-wired register) to a multiplier 544. The output signal of the multiplier 544 is the threshold value that is applied to the comparator 416, shown in FIG. 4.

The configuration shown in FIG. 5 may result in a rapid variations in the threshold value when images having relatively high spatial frequencies are processed. To prevent these rapid variations from affecting the value of the threshold signal, it may be desirable to provide (not shown) the output signals of the adders 536 and 538 to the maximum circuit 542 in place of the output signals of the delay elements. In this alternative embodiment, the threshold is five percent of the larger of the low-pass filtered interlaced scan signal and the low-pass filtered interpolated signal. As another alternative, the output signal of the multiplier 544 may be applied to a low-pass filter, for example, a leaky integrator, to prevent sudden variations in the threshold value. As yet another embodiment of the invention, the threshold value may be a constant provided to the comparator 416, shown in FIG. 4, by the source of constant value 414, shown in phantom.

In an exemplary embodiment of the invention, the coefficient multipliers 522, 524, 526 and 528 multiply the sample values applied by the delay elements by the respective coefficient values 0.08, 0.419, 0.419 and 0.08. The exemplary coefficient 530, 532 and 534 multiply their respective sample values by factors of 0.25, 0.5 and 0.25.

Figure 6:
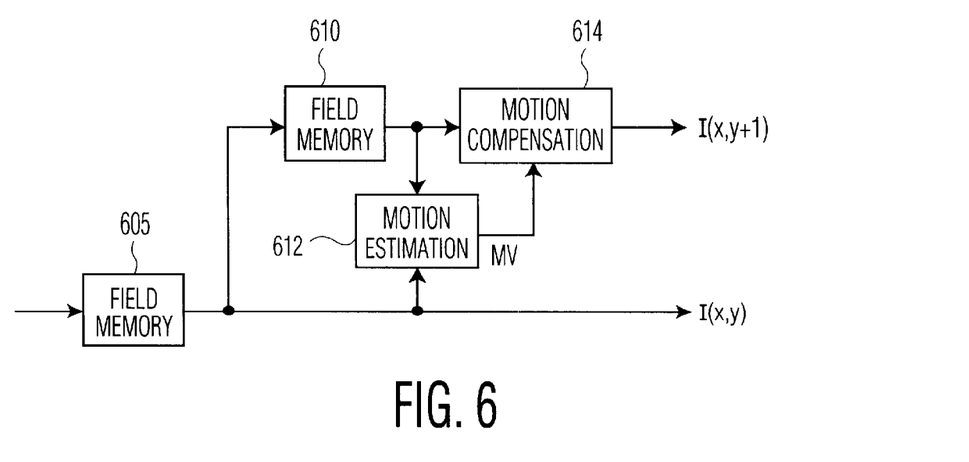
FIG. 6 is a block diagram of an exemplary motion-compensated interpolator that may be used as the interpolator shown in FIG. 4.

FIG. 6 is a block diagram of a motion compensated interpolator suitable for use with the interlace to progressive converter shown in FIG. 4. This interpolator includes two field memories 605 and 610, a motion estimation processor 612 and a motion compensation processor 614. The interlaced input signal I(x,y) is stored in the field memory 605 for one field interval and then passed on to the field memory 610. The motion estimation processor compares blocks of video data in the input signal I(x,y) from the memory 605 to corresponding blocks from previous field, as stored in the field memory 610. The motion estimation processor performs an autocorrelation between the two fields, convolving a block of, for example, eight by eight pixels from the memory 605 through pixels in the memory 610 that are displaced in a range defined by a maximum number of pixel positions from the position of the block in the current field. One exemplary system compares every block in the current field to corresponding blocks from the previous field that are displaced in a range of± six pixel positions in the horizontal and vertical directions.

The motion estimation processor generates a motion vector MV that indicates the displacement in the vertical and horizontal directions of a block of pixels from the field memory 610 that best matches the current block from the memory 605. The motion compensation processor collects the blocks identified by the motion estimation processor over an entire image and provides the samples from these blocks as the interpolated portion of the signal PROG, the signal I(x,y+1). The samples of the interlaced signal are provided as the signal I(x,y). The signals I(x,y) and I(x,y+1) are combined on alternate lines to form the progressive signal PROG.

The motion estimation processor 612 finds the best match between a block from the current image field memory 605 and a block in the field stored in the field memory 610, it does not always provide a perfect match. Errors in the matching algorithm become distortion in the reproduced progressive image. As set forth above, the subject invention compares the low-pass filtered vertical spatial frequency components of the interlaced and interpolated samples to determine if these filtered values differ by more than a threshold value. If they do, then the low-frequency components of the filtered interlaced signals are added to the interpolated signals. This operation corrects the interpolated signals by adding low spatial frequency information while not affecting the high frequency components of any of these samples. An example of the distortion that may be caused by a poor interpolation and the method by which the subject invention processes the video image to detect and correct for the poor interpolation are described below with reference to FIGS. 9 and 10.

Figure 3:
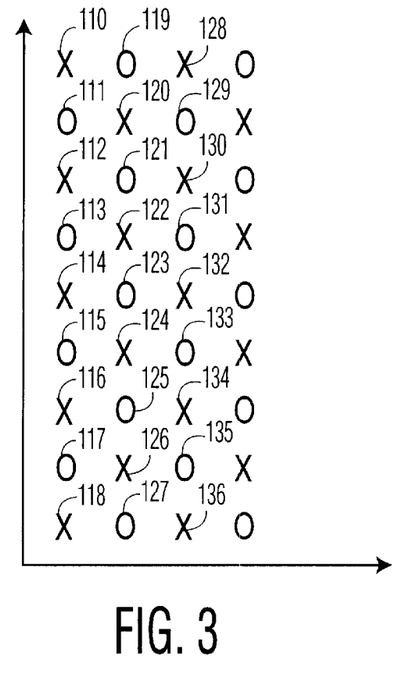
FIG. 3 is a vertical temporal graph of an interpolated progressive video that is useful for describing the operation of the present invention.
Figure 7:
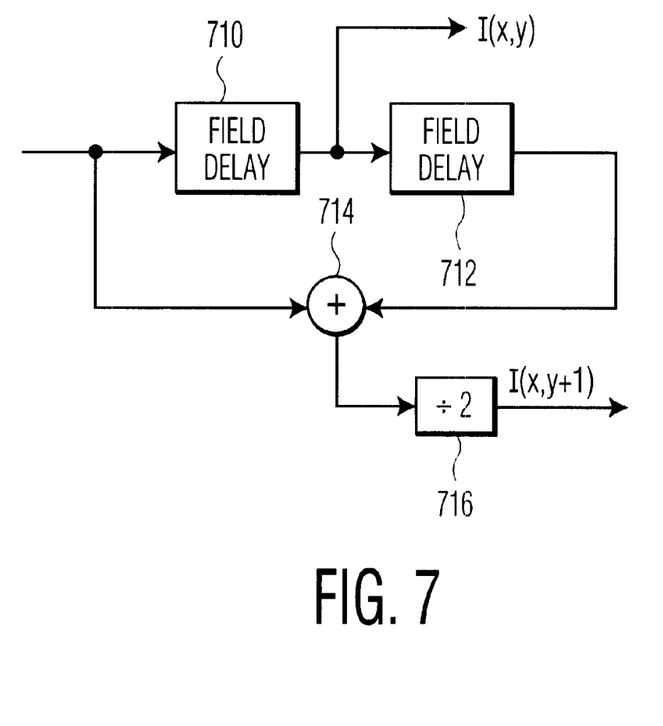
FIG. 7 is a block diagram of a first exemplary temporal interpolator that may be used as the interpolator shown in FIG. 4.

FIG. 7 is a block diagram of a simple interpolation filter that averages pixel values separated by one frame to provide pixel values for the interpolated samples in the intervening field. Referring to FIG. 3, if the sample applied to the input port of field delay element 710 is sample 132 then the sample provided at the output port of field delay element 712 is sample 114. These sample values are averaged by the summing circuit 714 and the divide-by-two circuit 716 to provide samples of the interpolated signal I(x,y+1) while the output signal of the field delay element 710 provides the samples of the interlaced signal, I(x,y). This interpolator produces good results in still areas of the image but may produce images having motion distortion artifacts in portions of the image that exhibit motion. Using conventional techniques, the interpolator shown in FIG. 7 would be combined with an intra-field interpolator (not shown) that averages adjacent lines in the interlaced field to form a motion-adaptive interpolator. This interpolator would switch between samples provided by the interpolator shown in FIG. 7 and the intra-field interpolated samples in areas of the image that are still and areas that exhibit motion, respectively. According to the present invention, the filter 412 corrects the progressive signal for interpolation errors obviating both the intra-field interpolator and the motion detector of a conventional motion-adaptive interpolator.

Figure 8:
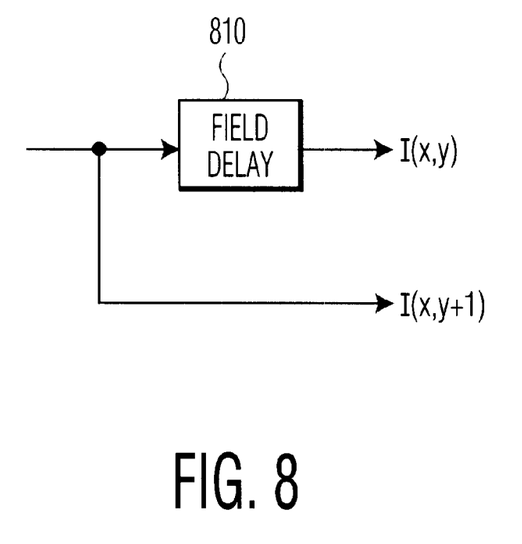
FIG. 8 is a block diagram of a second exemplary temporal interpolator that may be used as the interpolator shown in FIG. 4.
Figure 9:
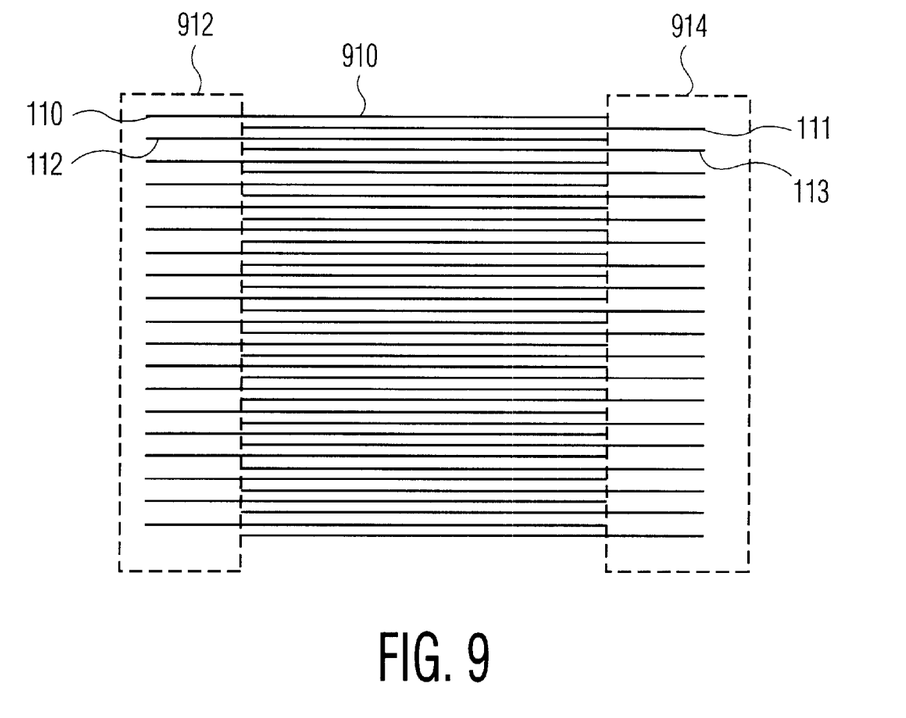
FIG. 9 is an image diagram that illustrates motion distortion that may occur when the second temporal interpolator is used.

FIG. 8 is a simple interpolator that uses samples which are delayed by one field interval in the delay element 810 as the interlaced signal I(x,y) and uses samples from the current field as the interpolated signal I(x,y+1). This interpolator may also produce progressive images having motion artifacts. An example of these motion artifacts is shown in FIG. 9. This interpolator may, for example, generate only one progressive frame for every two interlaced fields. This may be done by combining the current field with the field stored in delay element 810. The original field rate may be supported by repeating each progressive frame twice.

FIG. 9 is an image diagram showing the progressive image of a moving square as may be provided, for example, by the interpolator shown in FIG. 8. In the exemplary source image, a dark-colored square is moving across a light-colored background from left to right. The progressive image includes a portion 910 in which lines have the same value in both fields, a portion 912 that includes the left edge of the square in the even field and no part of the square in the odd field, and a portion 914 that includes the right edge of the square in the odd field and no part of the square in the even field. To relate the image shown in FIG. 9 to the vertical temporal diagram shown in FIG. 3, the progressive image includes lines 110 and 112 of the even field and 111 and 113 from the odd field. If the interpolator shown in FIG. 8 were used to generate the image shown in FIG. 9, the lines 111 and 113 would be the same as the lines 120 and 122, respectively.

Figure 10:
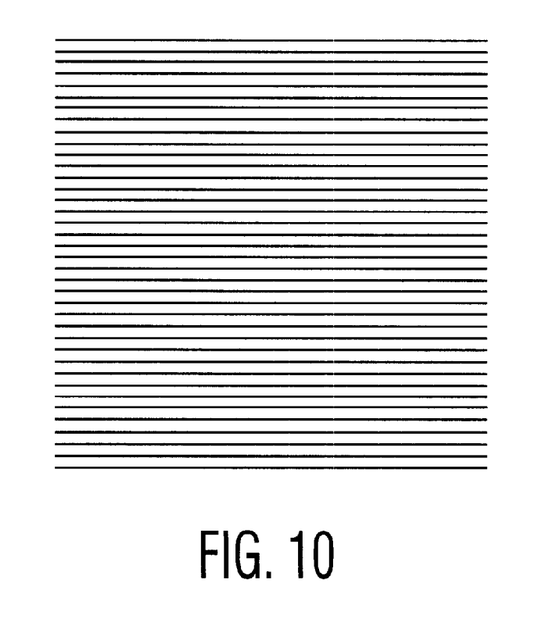
FIG. 10 is an image diagram that illustrates a corrected image corresponding to the image diagram of FIG. 9 that may be generated using the image interpolation system shown in FIG. 4.

FIG. 10 shows the result of applying the filter shown in FIG. 5 to the image shown in FIG. 9. In FIG. 10, because the samples in the portion of the progressive image 914 include background samples on the even lines and samples of the square on the odd lines, the low-pass filtered error signal is the difference between the background value and the square value. This negative value is added to the samples of the odd lines in the region 914 to effectively remove samples representing the square from region 914. In the same way, the even-line samples in the region 912 have the value of the square while the odd-line samples have the value of the background. In this instance the difference between the filtered odd-line samples and the filtered even-line samples is a positive value substantially equal to the difference between the value of the samples of the square and the value of the samples of the background. This value is added to the background samples in the area 912 to correct for errors in the interpolated image.

Although it is not shown in FIG. 9, because of the upper and lower edges of the square, the top two and bottom two lines of the square in Figure may exhibit some interlace distortion in the regions 912 and 914. Thus, while the filter shown in FIG. 5, improves the result provided by the interpolator shown in FIG. 8 it does not remove all of the distortion. The inventors have determined, however, that the filter operates well when used with a motion compensated interpolator such as that shown in FIG. 6.

It is contemplated that the interpolation system described above may be implemented in hardware or in software. When implemented in software, the system may reside in a computer program on a carrier such as a magnetic disk, optical disk, radio-frequency carrier wave or audio-frequency carrier wave. This software may configure a general purpose computer to perform the interpolation operations described above.

Although the invention has been described in terms of an exemplary embodiment, it is contemplated that it may be practiced as described above within the scope of the appended claims.

What is claimed:

1. A method for correcting low-motion distortion in an progressive scan video signal generated from an interlaced scan video signal by interpolating lines of samples between respective lines of the interlaced scan video signal, comprising the steps of:

low-pass filtering corresponding samples of a plurality of adjacent lines of the interlaced image to generate respective filtered interlaced samples;

low-pass filtering corresponding samples of a plurality of adjacent interpolated, lines that are among the plurality of adjacent lines of interlaced samples in the progressive image, to generate respective filtered interpolated samples;

subtracting the filtered interpolated samples from the filtered interlaced samples to generate corresponding error samples;

comparing the error samples to a threshold value; and for each error sample, if the error sample exceeds the threshold value adding the error sample to the corresponding interpolated sample to correct for the motion distortion in the progressive scan video signal.

2. A method according to claim 1, further including the step of generating the threshold value as a percentage of a maximum value of the corresponding samples of the plurality of adjacent lines of the interlaced image and of the corresponding samples of the plurality of adjacent lines of the interpolated image.

3. A method for generating a progressive scan video signal from an interlaced scan video signal having first and second image fields of sampled data interlaced scan lines, the method comprising the steps of:

interpolating interstitial lines of samples between respective pairs of the sampled data interlaced scan lines in both the first and second image fields of the interlaced scan video signal;

combining the interstitial lines of samples with the sampled data interlaced scan lines of the first and second image fields to form first and second image frames of non-interlaced scan lines; and filtering the first and second frames of non-interlaced scan lines to form the progressive scan video signal, the step of filtering comprising the steps of:

low-pass filtering corresponding samples of a plurality of adjacent ones of the interlaced scan lines to generate respective filtered interlaced samples;

low-pass filtering corresponding samples of a plurality of adjacent ones of the interstitial lines to generate respective filtered interstitial samples; and subtracting the filtered interstitial samples from the filtered interlaced samples to generate corresponding error samples;

comparing the error samples to a threshold value; and for each error sample, if the error sample exceeds the threshold value, adding the error sample to the corresponding interstitial sample to generate the progressive scan video signal.

4. A method for generating a progressive scan video signal from an interlaced scan video signal having first and second image fields of sampled data interlaced scan lines, the method comprising the steps of:

interpolating interstitial lines of samples between respective pairs of the sampled data interlaced scan lines in at least one of the first and second image fields of the interlaced scan video signal;

low-pass filtering corresponding samples of a plurality of adjacent ones of the interlaced scan lines to generate respective filtered interlaced samples;

low-pass filtering corresponding samples of a plurality of adjacent ones of the interstitial lines to generate respective filtered interstitial samples;

subtracting the filtered interstitial samples from the filtered interlaced samples to generate corresponding error samples;

comparing the error samples to a threshold value;

for each error sample, if the error sample exceeds the threshold value, adding the error sample to the corresponding interstitial sample to provide corrected interstitial samples; and combining the corrected interstitial lines of samples with the sampled data interlaced scan lines of the at least one image field to form the progressive video signal.

5. A filter which corrects errors in progressive scan video signals generated from interlaced scan video signals by interpolating lines of interstitial samples between respective pairs of lines of samples of the interlaced scan video signals, the apparatus comprising;

a first low-pass filter coupled to receive corresponding samples from successive lines of the interlaced scan video signal, for providing vertically low-pass filtered interlaced samples;

a second low-pass filter coupled to receive corresponding samples from successive lines of the interstitial samples for providing vertically low-pass filtered interstitial samples;

a subtracter that subtracts the vertically low-pass filtered interstitial samples from the vertically low-pass filtered interlaced samples to provide respective error samples;

means for providing a threshold value;

a comparator that compares the error samples to the threshold value; and an adder that combines the error samples with corresponding interstitial samples when the error samples exceed the threshold value.

6. A filter according to claim 5, wherein the means for providing the threshold value is a register containing a predetermined digital value.

7. A filter according to claim 5, wherein the means for providing the threshold value comprises:

a maximum circuit, coupled to receive ones of the samples applied to the first and second low-pass filters for providing one of the received samples that not less than any other one of the received samples; and a multiplier which multiplies the provided sample by a scale factor to generate the threshold value.

8. A filter according to claim 5, wherein:

the first filter is a four-tap FIR filter having coefficients of 0.08, 0.419, 0.419, and 0.08;

the second filter is a three-tap FIR filter having coefficients of 0.25, 0.5, 0.25; and the three samples received by the second filter are between the four samples received by the first filter in the progressive image.

9. An interlaced scan to progressive scan converter which generates a progressive scan video signal from an interlaced scan video signal having sampled data interlaced scan lines, the converter comprising:

an interpolator which interpolates lines of interstitial samples between adjacent lines of samples of the interlaced scan video signal;

a first low-pass filter coupled to receive corresponding samples from a plurality of adjacent ones of the interlaced scan lines to generate respective filtered interlaced samples;

a second low-pass filter coupled to receive corresponding samples from of a plurality of adjacent ones of the interstitial lines to generate respective filtered interstitial samples;

a subtracter that subtracts the filtered interstitial samples from the filtered interlaced samples to generate corresponding error samples;

means for providing a threshold value;

a comparator that compares each error sample to the threshold value and produces a control signal having a first state when the error sample exceeds the threshold value and having a second state otherwise; and a summing circuit, responsive to the control signal having the first state, for adding the error value to the corresponding interstitial sample to provide corrected interstitial samples, the combination of the lines of interlaced samples and the lines of corrected interstitial samples forming the progressive video signal.

10. An interlaced scan to progressive scan converter according to claim 9, wherein the means for providing the threshold value is a register containing a predetermined digital value.

11. An interlaced scan to progressive scan converter according to claim 9, wherein the means for providing the threshold value comprises:

a maximum circuit, coupled to receive ones of the samples applied to the first and second low-pass filters for providing one of the received samples that not less than any other one of the received samples; and a multiplier which multiplies the provided sample by a scale factor to generate the threshold value.

12. An interlaced scan to progressive scan converter according to claim 9, wherein:

the first filter is a four-tap FIR filter having coefficients of 0.08, 0.419, 0.419, and 0.08;

the second filter is a three-tap FIR filter having coefficients of 0.25, 0.5, 0.25; and the three samples received by the second filter are between the four samples received by the first filter in the progressive image.

13. An interlaced scan to progressive scan converter according to claim 9, wherein the interpolator is a motion compensated interpolator.

14. An interlaced scan to progressive scan converter according to claim 9, wherein the interpolator is a temporal interpolator.

15. A computer-readable carrier including computer program instructions for a general purpose computer, the instructions causing the computer to correct low-spatial frequency distortion in an progressive scan video signal generated from an interlaced scan video signal by interpolating lines of samples between respective lines of the interlaced scan video signal, the instructions causing the computer to perform the steps of:

low-pass filtering corresponding samples of a plurality of adjacent lines of the interlaced image to generate respective filtered interlaced samples;

low-pass filtering corresponding samples of a plurality of adjacent interpolated, lines that are between the plurality of adjacent lines of interlaced samples in the progressive image, to generate respective filtered interpolated samples;

subtracting the filtered interpolated samples from the filtered interlaced samples to generate corresponding error samples;

comparing the error samples to a threshold value; and for each error sample, if the error sample exceeds the threshold value, adding the error sample to the corresponding interpolated sample to correct for the low-spatial frequency distortion in the progressive scan video signal.

* * * * *